Inventor
Walter F. Strehlow
by Kimball A. Wyman
Attorney

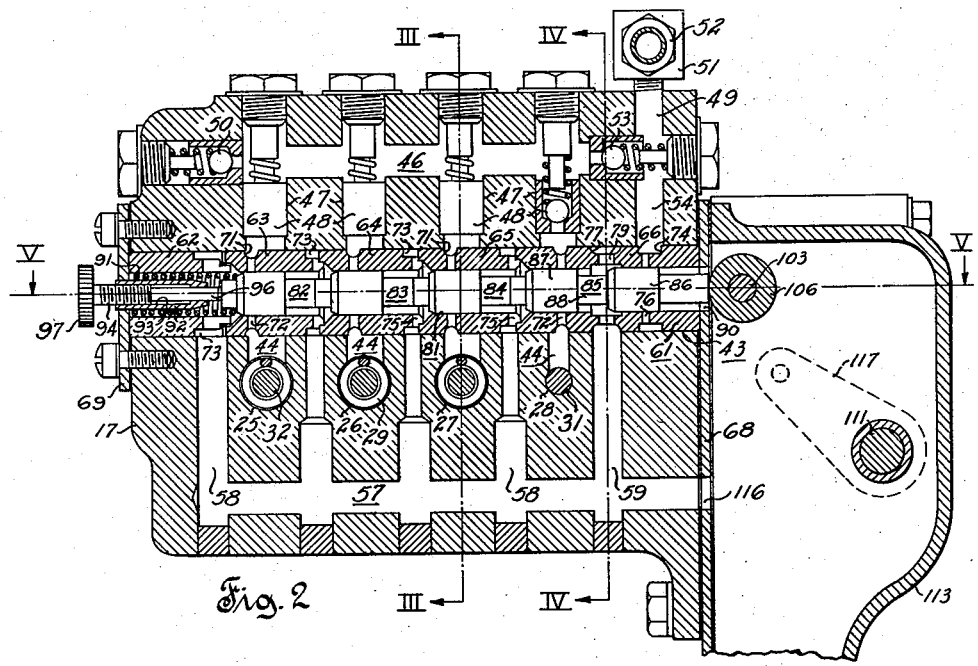
Fig. 2
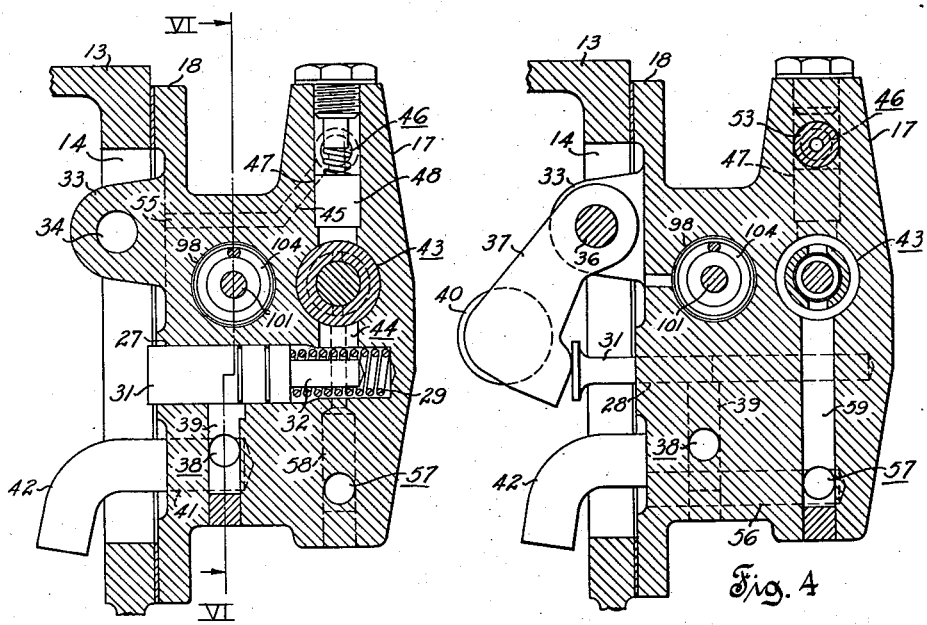
Fig. 3
Fig. 4
Inventor
Walter F. Strehlow
by Kimball S. Wyman
Attorney Sept. 23, 1952 W. F. STREHLOW 2,611,245
PUMP AND MOTOR HYDRAULIC SYSTEM AND
REGULATING APPARATUS THEREFOR
Filed May 19, 1948 4 Sheets-Sheet 3

Sept. 23, 1952 W. F. STREHLOW 2,611,245
PUMP AND MOTOR HYDRAULIC SYSTEM AND
REGULATING APPARATUS THEREFOR
Filed May 19, 1948 4 Sheets-Sheet 4

Inventor
Walter F. Strehlow
by Kimball A. Wyman
Attorney

Patented Sept. 23, 1952

2,611,245

UNITED STATES PATENT OFFICE 2,611,245

PUMP AND MOTOR HYDRAULIC SYSTEM AND REGULATING APPARATUS THEREFOR

Walter F. Strehlow, Wauwatosa, Wis., assignor to Allis-Chalmers Manufacturing Company, Milwaukee, Wis., a corporation of Delaware Application May 19, 1948, Serial No. 27,928

23 Claims. (Cl. 60—52)

This invention relates generally to hydraulic apparatus and is more particularly directed toward apparatus for supplying and/or controlling a positive variable discharge of pressure maintaining fluid suitable for operating hydraulic motors such as a ram unit adapted to be mounted on a tractor or on a tractor drawn implement.

In the operation of ram units for raising or lowering the various types of tractor attached or drawn implements, a relatively high initial pressure is required to overcome inertia of the load and/or effect a rapid acceleration thereof, and the means for supplying pressure fluid to the ram unit or units must be capable of maintaining an effective pressure during a maximum rate of ram displacement. Moreover, if the implement is to be retained in a partially raised position, the means for supplying pressure fluid must also be capable of effecting, when desired, an immediate further raising of the implement. Furthermore, in order to render a hydraulic system satisfactory for regulating depth of penetration of a soil working implement in response to variations in draft force, the pump and control means should be capable of affording an infinite number of rates at which the ram unit or units can be operated to raise or lower the implement and/or of affording an increment adjustment of implement position. However, once the implement has been raised or partially raised, as desired, only a fraction of the fluid initially delivered by the pump is required to compensate for possible leakage and thereby maintain the implement in the position to which it has been raised.

Continued operation of a pressure fluid supplying means, such as a pump, to maintain a pressure sufficiently high for initial and/or accelerating requirements is undesirable in that operating costs are unnecessarily high and in that such operation results in excessive wear and heating, both of which are detrimental to pump life. In addition, the initial cost of the apparatus is also high and such features as compactness, simplicity and the ease with which the apparatus can be attached to or removed from a tractor or other vehicle affording a limited mounting space, require particular consideration. Furthermore, it is also desirable to provide apparatus affording a wide range of effective operation without the use of cumbersome parts such as a pressure maintaining tank or accumulator.

Therefore, the present invention is directed toward and has as an object the provision of a hydraulic pump and control apparatus including an improved construction and combination of parts operative to develop a pressure effective to initiate and rapidly complete, when desired, a load raising power stroke of a ram unit operated with fluid delivered by the pump, and operative to maintain the load in its raised position, by utilizing only a fraction of the fluid being delivered by the pump.

It is also an object of this invention to provide a hydraulic apparatus including a pump means, a control therefor, and a ram unit combined for coaction in an improved manner operative to develop a pressure effective to initiate and rapidly complete, when desired, a load raising power stroke of the ram unit, and operative in response to a completion of such power stroke to decrease the quantity of pressure maintaining fluid being delivered by the pump means.

Another object of the present invention is to provide a hydraulic apparatus including a pump means, a motor receiving operating fluid from the pump means, and a control therefor constructed and combined for coaction in an improved manner rendering a manual control means operative to vary the discharge of pressure maintaining fluid, as desired, and affording an additional means operative in response to the power stroke of the motor to decrease the volume of pressure maintaining working fluid to a predetermined minimum whenever the manual control means is positioned to effect a delivery of pressure maintaining fluid in excess of said minimum.

Another object of this invention is to provide a hydraulic apparatus including a pump means, a ram unit receiving operating fluid from the pump means, and control means constructed and combined for coaction in an improved manner such that a single movement of an external lever results in the ram piston moving to and being hydraulically locked in one of its limiting positions and such that a predetermined pressure head is maintained effective through delivery of a minimum quantity of pressure maintaining fluid.

Still another object of the present invention is to provide a compact hydraulic pump and control unit incorporating parts constructed and combined in an improved manner whereby a single control valve unit is selectively positionable to direct liquid discharged from the pump to the source of liquid supply, to a working fluid passage means, or to both, as desired, and to place a hydraulic motor connected with the working fluid passage means in pressure relieving communication with said source of supply.

It is also an object of this invention to provide an improved hydraulic apparatus including a pump means and a control therefor constructed and combined for coaction in a manner affording an infinite number of rates at which a ram unit can be moved and/or affording an increment adjustment of the position thereof.

Still another object of this invention is to provide a compact hydraulic pump and control unit including parts constructed and combined for coaction in an improved manner affording ready attachment of the unit to a lubricant confining, power shaft enclosing casing or housing in covering relation to an opening therein and which is thus operatively positioned relative to the confined lubricant and to the enclosed shaft without the inclusion of gears or other driven rotating parts as elements of the power transmitting mechanism.

An additional object of this invention is to provide a compact multiple plunger pump unit incorporating parts constructed and combined for controlled coaction in an improved manner conducive to minimizing operating costs, pump wear, and heating of the pumped liquid.

The construction and operation of apparatus capable of accomplishing one or more of the above stated objects will become readily apparent as the disclosure progresses and particularly points out the various advantages and features considered of special importance. And accordingly, the present invention may be considered as comprising the various constructions, combinations and/or subcombinations as is hereinafter more fully set forth in the detailed description and appended claims reference being had to the accompanying drawings, in which:

Fig. 2 is a sectional view taken on line II—II of Fig. 1;

Fig. 3 is a sectional view taken on line III—III of Fig. 2;

Fig. 4 is a sectional view taken on line IV—IV of Fig. 2;

Figure 1:
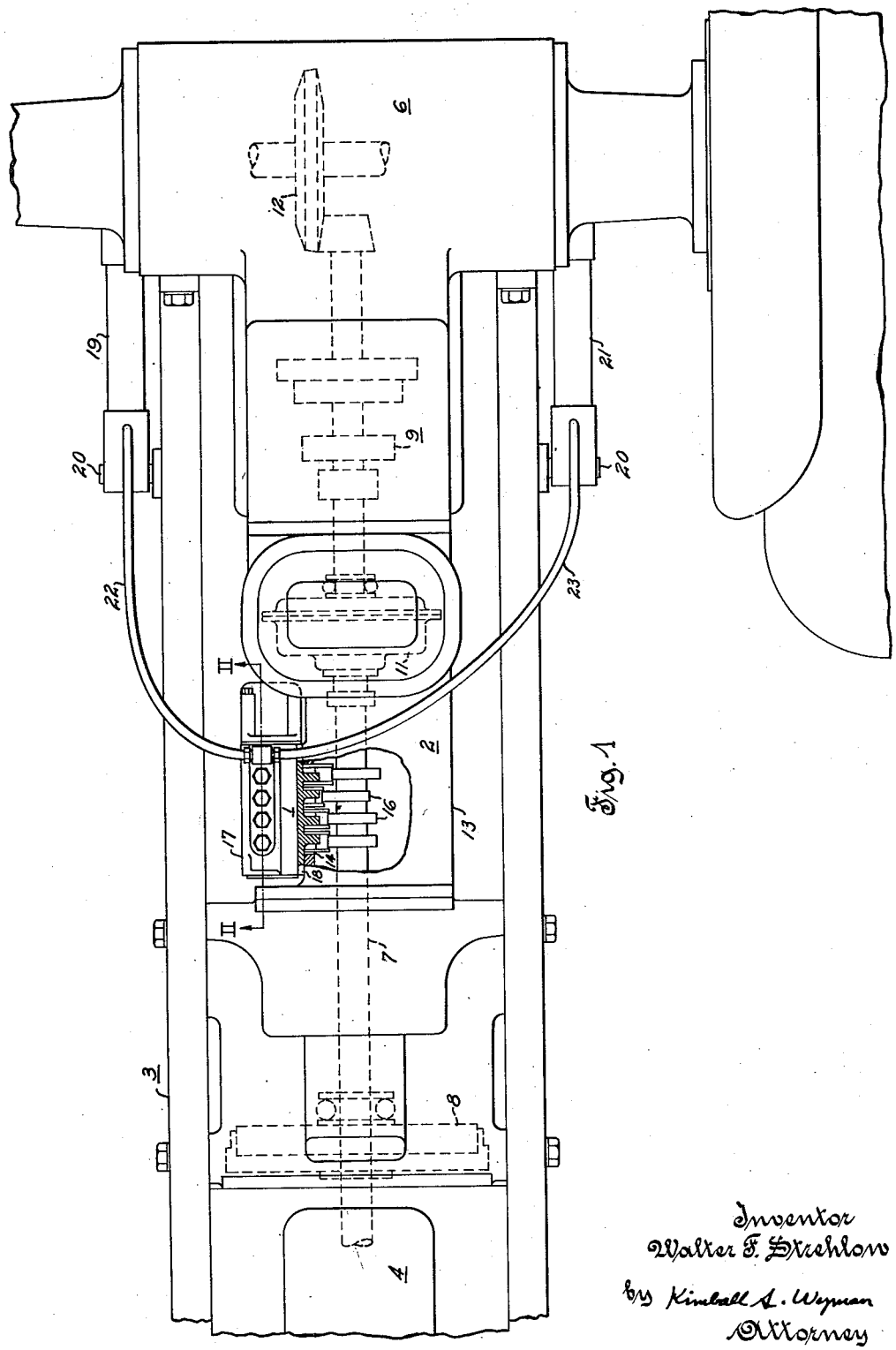
Fig. 1 is a partial plan view of a tractor, having attached thereto apparatus embodying the invention, with parts broken away and other parts indicated schematically.

Referring now to Fig. 1 it will be seen that the particular embodiment chosen to illustrate the present invention comprises a hydraulic pump unit 1 attached to drive housing 2 of a tractor 3 in longitudinally spaced relation with and intermediate the tractor engine 4 and the rear axle structure 6. Drive housing 2 includes a drive shaft 7, a main clutch 8 operatively connecting the drive shaft in driven relation with the engine 4, a change speed gearing 9, an auxiliary clutch 11 for operatively connecting drive shaft 7 and gearing 9, and a differential gearing 12 in rear axle structure 6 operatively connected in driven relation with the change speed gearing 9. A lubricant confining portion 13 of drive housing 2 is provided with an opening 14 therethrough intermediate main clutch 8 and auxiliary clutch 11 which exposes cam portions 16 on drive shaft 7. The hydraulic pump unit 1 comprises a housing 17 detachably secured to the side of drive housing 2, as by bolts, in covering relation with respect to the opening 14 therethrough. The side of pump housing 17 opposing opening 14 in drive shaft housing 2 is provided with marginal surfaces 18 for sealingly engaging the side wall surfaces of the drive shaft housing. A pair of hydraulic motors, in this case single acting ram units 19 and 21, are pivotally supported on transverse aligned pins 20 for vertical swinging movement about a common transverse axis and the ram cylinders are operatively connected with pump and control unit housing 17 by a pair of conduits 22 and 23 for the flow of lubricant to and from the rams. The piston portions of rams 19 and 21 are operatively connected with tractor mounted implement lift arms (not shown) in a conventional manner.

Referring also to Figs. 2 to 6, inclusive, it will be apparent that the side of pump housing 17 enclosing the opening 14 in lubricant confining portion 13 of the drive shaft housing is provided with four inwardly extending parallel cylindrical chambers 25, 26, 27 and 28, chambers 25, 26 and 27 being of equal diameter and chamber 28 having a materially reduced diameter. A compression spring 29 (see Fig. 3) is positioned within each chamber at the inner end thereof and each chamber includes a pump plunger 31 having a reduced inner end portion 32 disposed in guiding relation within the associated compression spring. The opening enclosing side of housing 17 is also provided with outwardly extending projections 33 having aligned holes 34 therethrough receiving and fixedly mounting a shaft or rod part 36 disposed at a right angle with respect to the axes of pump plungers 31 and generally parallel to a plane therethrough. And a plurality of cam followers 37, one for each pump, are pivotally supported on shaft part 36 for swinging movement relative thereto and relative to each other, the lower end portions 40 of these followers being disposed between the outer ends of pump plungers 31 and the opposed cam portions 16 on shaft 7 thereby establishing an operative connection between power driven shaft 7 and pump unit 1. (See Fig. 1.)

Pump housing 17 is provided with an intake manifold passage 38 severally communicating with pump chambers 25 to 28 through intake passages 39 and communicating with the lubricant in drive shaft housing 2 through a main intake passage 41 terminating in the opening enclosing side of housing 17 below the pump side of housing 17 below the pump plungers 31 therein. Passage 41 includes an extending conduit portion 42 (see Fig. 3) projecting outward therefrom through the opening 14 and downward into the fluid confined in drive shaft housing 2. Housing 17 is also provided with a cylindrical valve chamber 43 which extends therethrough in spaced overlying relation with respect to pump cylinders 25 to 28 and in parallel right angle relation thereto. A plurality of passages 44, one for each pump, severally connect the inner or discharge ends of the pump cylinders with longitudinally spaced portions of cylindrical valve chamber 43. In addition, housing 17 includes a horizontal bore 46 which is disposed above valve chamber 43 in generally parallel relation thereto and which is connected therewith through a group of passages 47 corresponding in number to pump discharge passages 44. And in this connection it should be noted that passages 47 communicate with valve chamber 43 in diametrically opposed relation to passages 44. Each passage 47 is provided with a spring biased ball check valve 48 controlling the flow of fluid therethrough and into bore 46. This bore, which may be considered a manifold space, communicates at its right hand end (note Fig. 2) with an outlet passage 49 for working fluid which terminates in an upwardly extending pipe connection 51 provided with a suitable connector 52 for coupling ram hose 22 and 23 or the like thereto. Communication between outlet passage 49 and manifold space 46 is controlled by a spring biased ball check valve 53 preventing a back flow of fluid from passage 49 into the manifold space 46. In addition, it should be noted that this discharge fluid passage has a branch portion 54 on the discharge side of check valve 53 placing same in communication with the right hand end of cylindrical valve chamber 43. And at the left hand end of manifold space 46 is a pressure relief passage means 45 having a spring biased ball check valve 50 controlling the flow of fluid back to drive shaft housing 2 through passage 45 to an opening 55 in the opening enclosing side of pump unit housing 17. Ball valve 50 opens upon attainment of a predetermined pressure in space 46 to prevent damage to parts associated therewith from possible excessive pressure.

Figure 6:
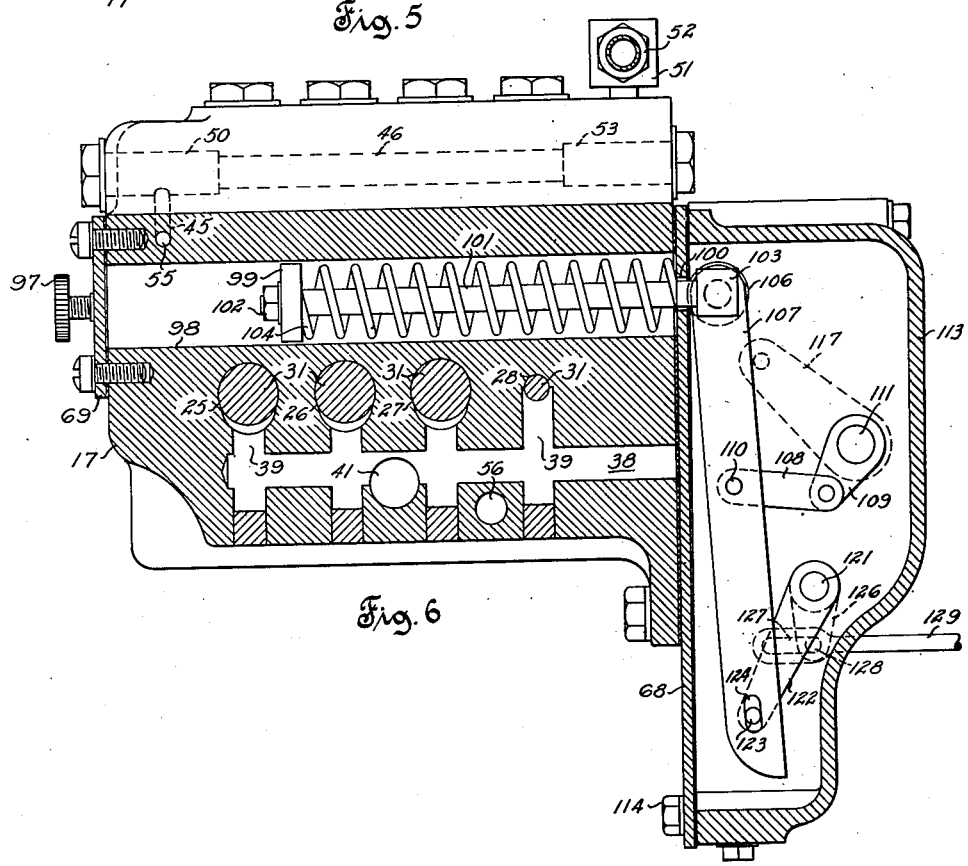
Fig. 6 is another sectional view taken on line VI—VI of Fig. 3.

Housing 17 is also provided with a main fluid return passage means comprising a horizontal bore 56 opening through the side surface of the housing closing the opening in drive shaft housing 2 at a point somewhat below and to one side of intake conduit 41 (Fig. 6). The inner end of return passage bore 56 communicates with a bore 57 at right angles thereto (Figs. 2 and 4) which extends nearly through the pump housing in generally parallel relation to and below valve chamber 43. This bore is also disposed below pump chambers 25 to 28 and a plurality of passages 58 corresponding in number to pump discharge passages 44 place bore 57 in communication with longitudinally spaced portions of cylindrical valve chamber 43, these passages being disposed adjacent the pump cylinder chambers 25 to 28 and to the passages 44 severally connecting the discharge side of the pumps with longitudinally spaced portions of cylindrical valve chamber 43 as previously described. Another passage 59 places return passage bore 57 in communication with a right end portion of valve chamber 43 in longitudinally offset diametrically opposed relation with respect to the branch portion 54 of outlet passage 49.

Referring again to Fig. 2 it will be seen that a cylindrical liner 61 comprising axially separable sections 62 to 66 is disposed in cylindrical valve chamber 43 with innermost section 66, that is, the section adjacent the right hand end of chamber 43, abutting cover plate 68. The opposite end section, that is, the section at the left hand end of chamber 43 is held in position by end abutting engagement with cover plate 69. Cylindrical sections 62 to 66 are provided with circumferential external grooves 71 placing pump discharge passages 44 in communication with check valve control passages 47. In addition, each section is provided with transverse bores 72 (see also Fig. 5) placing the interior thereof in communication with diametrically opposed pairs of passages 44 and 47. Furthermore, the end abutting portions of cylindrical sections 62 to 66 have parts thereof cut away and shaped to afford circumferential external grooves 73, rectangular in cross section, each of which communicates with the interior of the chamber 43 formed by these sections through diametrically opposed transverse passages 75. The rectangular external passages 73 formed between end portions of cylindrical liner sections 62 through 66 communicate with passages 58 placing same in communication with the main fluid return passage 57. In addition, the innermost cylindrical section 66 is provided with two circumferential external grooves, the innermost groove 74 communicating with ram outlet passage 54 and having a transverse bore 76 therethrough placing diametrically opposed portions of groove 74 in communication with the interior of section 66, and a second groove 77 communicating with passage 59 which in turn communicates with the right hand end of main fluid return passage 57. Groove 77 also communicates with the interior of liner section 66 through diametrically opposed transverse bores 79.

A cylindrical control valve 81 is positioned in the generally cylindrical chamber 43 formed by the end abutting liner sections 62 through 66 and preferably this valve is formed by a series of separable cylindrical elements 82 to 85, inclusive, disposed in end abutting relation, the end abutting portions of these cylindrical valve elements being reduced to form annular spaces between same and the surrounding internal surfaces of the liner sections. In this connection it should be noted that the right hand or innermost valve element 85 comprises an intermediate reduced portion 88 uniting enlarged cylindrical portions 86 and 87 which in turn terminate in reduced oppositely projecting end portions, the inner one of which abuts the reduced portion on adjacent element 84 and the other of which projects through a coaxial opening 90 in cover plate 68. The valve elements are held in end abutting relation for movement as a unit by means of a compression spring 91 seated on valve element 82 in surrounding relation to the reduced outer end portion thereof with its opposite end abutting the inner surface of cover plate 69. Movement of the valve elements to the left as viewed in Fig. 2 may be adjustably limited through the medium of an inwardly projecting part 92 carried by cover member 69, this part having an internally threaded bore 93 extending therethrough in which is adjustably positioned a screw threaded element 94 having a reduced end portion 96 disposed in coaxial abutting relation with respect to a similar projection on the adjacent valve element 82. The outer exposed end of part 92 is provided with a knurled adjusting knob 97.

Figure 5:
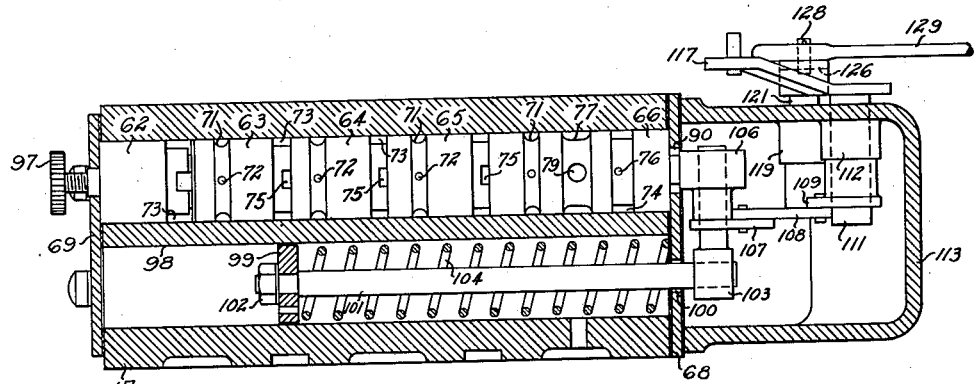
Fig. 5 is a sectional view taken on line V—V of Fig. 2.
Figure 7:
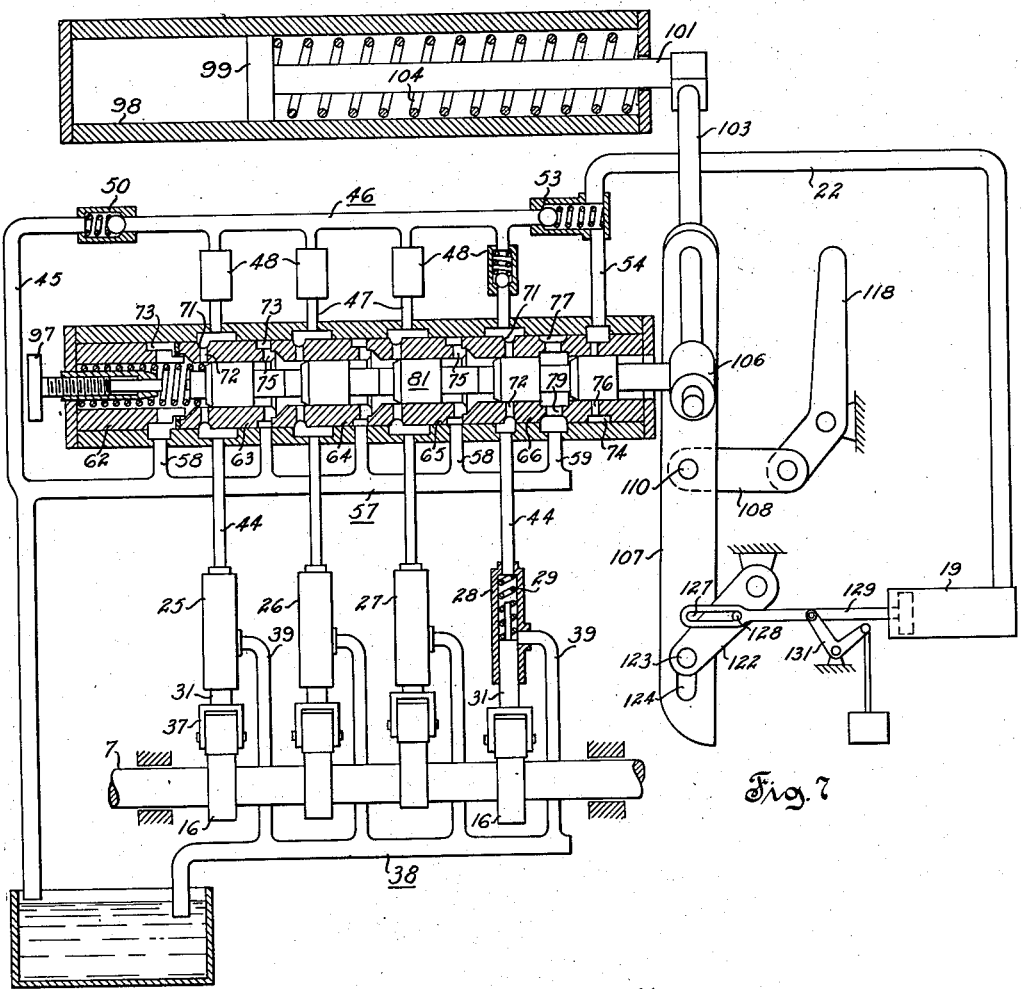
Fig. 7 is a schematic showing, partly in section, of the apparatus embodying the invention.

Referring more particularly to Figs. 5 and 6, it will be noted that pump housing 17 also defines a second cylindrical chamber 98 in laterally spaced parallel relation with valve chamber 43, this chamber including a piston 99 having a control rod 101 attached thereto by nut 102 or other suitable means. Cover plate 68 which closes one end of chambers 43 and 98 has an opening 100 therethrough coaxial with chamber 98 through which control rod 101 extends for connection with a stub shaft 103 extending at right angles to rod 101 and generally parallel to cover plate 68. A compression spring 104 is positioned in chamber 98 between piston 99 and cover plate 68 for urging the piston and rod away from cover plate 68. Stub shaft 103 projects toward control valve 81 and has mounted on its adjacent end portion a roller 106 positioned in opposed engaged relation with respect to the reduced end portion of the innermost valve element 85 which extends through cover plate 68. Roller 106 also has connected therewith the upper end of a lever 107 having an intermediate portion thereof pivotally connected at 110 with a link 108 which in turn is pivotally connected with an arm 109 fixed to an inner end portion of a shaft 111 rotatably supported in a bearing structure 112 carried by a control linkage housing 113. This housing 113 is detachably secured in abutting sealed relation against cover plate 68 by means of suitable cap screws 114 or the like. And in this connection it should be noted that cover plate 68 is provided with a suitable opening 116 which is aligned with and places main return passage bore 57 in communication with the interior of the linkage housing (see Fig. 2). Consequently, this housing contains oil at a level conforming with that in drive shaft housing 2. The outer end of shaft 111 has a lever arm 117 fixed thereto which in turn may be connected through a link or other means (not shown) with a suitable manually actuable control lever 118 as indicated in Fig. 7. The lower portion of housing 113 supports another bearing structure 119 which in turn rotatably supports a shaft 121 having a portion thereof within housing 113 to which is fixed an arm 122 operably connected to the lower end of lever 107 as by a pin 123 on the arm being slidably fixed in a slot 124 on lever 107. The end of shaft 121 projecting outward from housing 113 has fixedly mounted thereon an arm 126 having a pin 128 affording a lost motion connection with slotted portion 127 of rod 129 which in turn is operatively connected with one end of a ram actuated bellcrank lever 131. See Fig. 7.) Spring 104 in chamber 93 is relatively strong as compared with the spring 91 acting on control valve 81 and consequently piston 99, control rod 101 and valve 81 tend to assume the position shown in Fig. 2. However, it should be noted that the manual control lever 118 may be moved so as to shift the fulcrum 110 for lever 107, that is, the fulcrum afforded by the connection of link 108 to an intermediate portion of lever 107, and thereby move rod 101 and piston 99 toward the right as viewed in Fig. 2 which in turn compresses spring 104. As a result of such movement spring 91 urges control valve 81 toward the right (note Fig. 5) and acts to maintain the reduced righthand end of this valve in engagement with roller 106. Movement of valve 81 toward the right is limited by engagement of the innermost enlarged portion 88 of valve element 85 with cover plate 68.

In addition to the above described movement of control valve 81 through shifting of the manually controllable fulcrum point 110, it will be noted that the control valve is also positionable through movement of the bellcrank actuated linkage in the lower portion of housing 113. Referring to Figs. 6 and 7, it will be seen that movement of bellcrank lever 131 to one of its limiting positions, in this case its full lift position, causes pin 128 to bear against the right end of slot 127 thus causing arm 126 to rotate shaft 121 clockwise, which in turn moves arm 122 inside of housing 113 in a clockwise direction, shifting lever 107 to the left. Lever 107 moving about fulcrum point 110 brings roller 106 away from cover plate 68 compressing spring 104 and permitting control valve 81 to move to the right to the position shown in Fig. 7, that is, the unloaded position with three plungers delivering liquid to return passage 57, one plunger delivering liquid to space 46, and ram relief passage 59 blocked to prevent escape of fluid therethrough from the rams. In this position the enlarged bore controlling portions of valve elements 82 to 85 place transverse bores 72 in the associated liners 63, 64 and 65 in communication with the three corresponding return passages 58 thereby severally connecting pump discharge passages 44 in communication with the main return passage bore 57. However, it should be noted that the enlarged portions 86 and 87 of valve element 85 remain in closed relation with respect to associated transverse bores 72 and 76, respectively, and therefore pump 28 continues to deliver fluid through associated circumferential groove 71 and into manifold space 46 through the associated check valve control passage 47.

In the absence of excessive leakage, more particularly leakage through the flexible hose 22 and 23 and the connections between such hose and the ram cylinders 19 and 21 and pump housing 17, the main control valve 81 will remain in its unloaded position until the fulcrum 110 of lever 107 is shifted by actuation of manual control lever 118.

It may be well to note at this time that although the enlarged cylindrical flow controlling portions of valve 81 are of substantially equal axial length, the reduced portions are of different axial lengths and in addition the axial spacing of the circumferential grooves 71 and of the transverse bores or passages 72 connected therewith vary somewhat as to their axial spacing so as to afford the above mentioned regulation in response to an unloading movement of the control valve.

Figure 8:
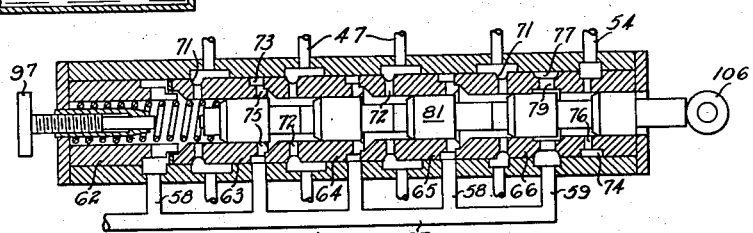
Fig. 8 is a view of the valve structure shown in Fig. 7 indicating a different position thereof.
Figure 9:
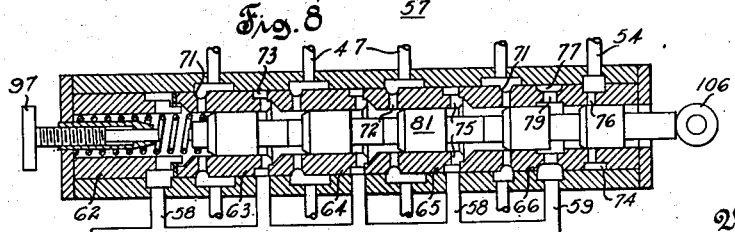
Fig. 9 is a view somewhat similar to Fig. 8 illustrating still another position of the control valve.

If with the control valve in either its full lift or unloading positions previously described it becomes desirable to lower the weight, all that has to be done is to move manual control lever 118 in a direction effective to shift the fulcrum 110 for lever 107 away from cover plate 68 a distance sufficient to permit spring 91 to move the main control valve 81 to the right until the enlarged end portion 86 thereof engages cover plate 68 as shown in Fig. 8. This position, termed the lowering position of the valve, places the discharge sides of all pumps in communication with the return passages 57 and 58 which in turn are in continuous communication with the main return passage means 56. Under these conditions liquid rapidly drains from the ram circuit, the ram piston moving to its retracted position through gravity action of the weight or other means actuated thereby. In other words, if the weight were to be considered as representing an agricultural implement or other load, movement of the valve 81 to its lowering position rapidly drops the implement onto the ground. If, however, it is desired to gradually lower the weight or implement onto the ground, this can be readily accomplished simply by moving the main control valve 81 so as to just barely open the transverse bore 76 placing the ram relief passage 54 in communication with the return passage 59. And if in this connection it should be desired to place all pumps in communication with the return passage means 57 through passages 58 and yet retain the ram in its extended position, this can be readily done by manually shifting the fulcrum 110 of lever 107 so as to position the main control valve 81 as indicated in Fig. 9. When thus positioned, it will be seen that the innermost enlarged portion 86 of the cylindrical control valve 85 closes the transverse bore 76, maintaining the ram relief passage 54 out of communication with the return passage means 59.

It should also be obvious that in addition to the various positions of the main control valve 81 hereinbefore described, the valve may be also positioned by a manual shifting of the fulcrum 110 for lever 107 so as to, if desired, effect a ram expanding action by connecting the discharge sides of two or more pumps with the check valve control passages 47 connecting same with manifold space 46. And while it is normally intended that the enlarged cylindrical portions of the main control valve 81 will be positioned so as to either open or close the radially extending transverse bores or passages 72 placing the circumferential external grooves 71 in communication with the interior of the valve chamber formed by the liner sections 62 to 66, it should be obvious that the valve elements 82 to 85 may be positioned so as to only partially open one or more of these transverse passages. Furthermore, it should be apparent that while the particular arrangement of the passages and valve elements herein shown for purposes of illustration constitutes a preferred embodiment of the present invention, other arrangements can be readily made as desired simply by changing the actual spacing of the control passages 71, circumferential grooves 72 and/or the axial length of the enlarged passage controlling portions of the valve elements 82 to 85.

Referring again to Figs. 2, 7, 8 and 9, it will be apparent that the position of valve 81 determines whether the weight, implement or device connected with the ram unit is to be raised, lowered or held in a selected position and, if the weight is being either raised or lowered, the rate of movement thereof. In this connection is should be noted that the illustrated embodiment of the present invention affords an infinite number of rates of discharge of fluid into manifold space 46 and consequently the rate of operating the ram unit to raise a weight or implement may vary through an infinite number of degrees of speed from minimum to maximum. Due to the fact that plungers 25 through 28 are successively placed in communication with manifold passages 47 and also because of the construction of valve elements 82 through 85, including the chamfered edges of the enlarged cylindrical portions intermediate the reduced end portions of these elements, it is possible to control the pump discharge, either to manifold space 46 or to return passage 57, through a wide range of operating speeds. For example, in lifting, the rate of discharge to space 46 can be controlled from a minimum setting with associated return passage 73 of pump 28 being barely closed and fluid from pump 28 being discharged at a relatively slow rate into space 46 through associated circular groove 71, bore 72 and passage 47, to a maximum setting with all return passage grooves 73 blocked off and the four plungers discharging into space 46 through grooves 71, bores 72 and passages 47. Then, too, the chamfered end portion of the innermost enlarged cylindrical portion 86 of valve element 85 affords a means for varying the rate of flow of fluid from ram passage 54 through groove 74 and bore 76 to ram relief passage 59 leading to drive shaft housing 2. Consequently, it is possible to effect an increment adjustment of implement or weight position and to hold the implement or weight in a selected position simply by moving the main control valve to its hold position shown in Fig. 7.

In addition to the above mentioned features affording control of the pump discharge it will be noted that additional control is afforded through adjustment of part 92 at the left hand end of valve chamber 43 as viewed in Fig. 2. This screw threaded element is operable to selectively limit the travel of control valve 81 and consequently determines the maximum rate of discharge to manifold 46. And, if desired, adjustment part 92 may be moved to achieve any desired position of control valve 81 irrespective of the position of manual control lever 118 or bellcrank 131. This feature is particularly desirable in the event that foreign matter in the hydraulic system prevents proper response of the control valve to movement of manual control 118 or bellcrank lever 131, in which case adjusting screw 92 can be manually moved back and forth to cause valve 81 to be freed of the foreign matter causing such condition.

And while thus far the valves 48 and 53 have been considered as spring biased check valves and no mention has been made as to the degree of biasing action afforded by the spring associated therewith, it should be apparent the pressure maintaining action afforded by these valves may be varied as desired simply by the selection of suitable springs. For example, the strength of the spring associated with valve 53 may be such that this valve actually controls the discharge of working fluid from manifold space 46 or merely prevents a return flow of liquid into manifold space 46 in the event the pressure therein should become less than the pressure in passage 49. And in applying apparatus embodying the invention to the control of a ram unit as herein disclosed, the valve 53 could be omitted without materially affecting operation, since the primary function of this valve is to prevent a pressure relieving back-flow of liquid from the ram into manifold space 46. Consequently, it should be obvious that although certain advantages are afforded by the use of back-flow preventing valves in the working fluid passage means connected with a ram unit or like device, the invention in its broad aspects is applicable to any hydraulic apparatus utilizing a pressure maintaining pump and a valve means selectively positionable to vary the volume of pressure maintaining fluid discharged by the pump.

As to the advantages afforded by the inclusion of check valves 48 and 53, it should be apparent that when the pump unit is applied to lifting a weight or the like valve 53 prevents the relief valve 50 from responding to pressure surges or impulses transmitted to the system whenever the ram operated by the pump unit is subjected to a shock load. And, in the event that valve 53 sticks in a passage opening position, valves 48 provide protection for plungers 31 and parts associated therewith by preventing the back pressure created by action of a shock load on the system from reaching the plunger chambers. Furthermore, should the pump operating means stop for any reason while control valve 81 is in its lift or unloaded position ball valve 53 will seat itself and the fluid in the ram and passage 49 will be locked therein preventing the weight or implement, which is being lifted or held in a lifted position by the ram, from dropping suddenly and causing possible damage. And as previously mentioned, when valve 81 is in its hold position (Fig. 9) and no pumps are delivering liquid to space 46, valves 48 prevent any leakage past valve 53 from being transmitted back through passage 47 to the plunger chambers. In the last mentioned case, if valves 48 are biased sufficiently they will also serve to keep fluid discharged from the pumps from entering manifold 46 instead of flowing back to the source by way of bores 72, grooves 73 and return passage 58. Also, when less than all of the pumps are used for lifting, valves 48 are necessary to prevent a return flow of fluid from manifold 46 through those passages 47 which are in communication with return passages 58 through the interior of the valve chamber.

Thus it should be apparent that apparatus constructed in accordance with this disclosure possesses features affording all of the advantages noted herein, and also other advantages which are not mentioned particularly as they should be obvious to those skilled in the art.

And although the invention is illustrated as applied to a multiple plunger pump-ram combination, it is to be understood that certain of the objects can be accomplished either with or without the inclusion of a ram unit or other form of hydraulic motor and that it is not intended to limit the invention to the exact constructions and combinations herein shown and described as certain features thereof are of more general application and as various modifications within the scope of the appended claims may occur to persons skilled in the art.

It is claimed and desired to secure by Letters Patent:

1. In a hydraulic apparatus including a source of fluid, a plurality of pumps, means defining a valve chamber receiving fluid from said pumps, and a return passage means placing said valve chamber in communication with said source, a hydraulic motor connected with said valve chamber through a working fluid passage means including a one-way valve admitting fluid to said motor, and including a valve in said chamber selectively positionable to connect one or more of said pumps in pressure maintaining relation with said working fluid passage means and the remaining pumps, if any, with said return passage means, the combination of an unloading control comprising means responsive to a power stroke of said hydraulic motor and operatively connected with said control valve so that as said hydraulic motor completes its said power stroke said valve is moved to a position wherein only one of said pumps is delivering fluid to said working fluid passage means.

2. In a hydraulic apparatus including a source of fluid, a plurality of pumps, means defining a valve chamber receiving fluid from said pumps, and a return passage means placing said valve chamber in communication with said source, a hydraulic motor connected with said valve chamber through a working fluid passage means including a one-way valve admitting fluid to said motor, means for relieving the pressure on said motor comprising passage means including a portion of said valve chamber, and including a control valve in said chamber selectively positionable to connect one or more of said pumps in pressure maintaining relation with said working fluid passage means and the remaining pumps, if any, with said return passage means, said control valve being also positionable to place all of said pumps and said motor in communication with said return passage means, the combination comprising an unloading control comprising means responsive to a power stroke of said hydraulic motor and operatively connected with said control valve so that as said hydraulic motor completes its said power stroke said valve is moved to a position wherein only one of said pumps is delivering fluid to said working fluid passage means.

3. A hydraulic apparatus comprising a housing having a main inlet passage adapted for communication with a source of fluid, a plurality of pumps within said housing and including portions projecting from said housing for actuation by means externally thereof, said housing including inlet passages severally connecting the intake sides of said pumps with said main passage, a cylindrical valve chamber, a first group of passages severally connecting the discharge sides of said pumps with said valve chamber, a bypass duct in said housing arranged to return fluid to said source, and a second group of passages placing said valve chamber in communication with said bypass duct and conforming in number and generally related to said pumps, a hydraulic ram connected with said valve chamber through a working fluid passage means including a one-way valve admitting fluid to said ram, means for relieving fluid pressure on said ram comprising passage means including a portion of said valve chamber, an annular grooved cylindrical valve in said valve chamber selectively positionable to selectively severally connect one or more of said pumps with said bypass duct through said second group of passages and the remaining pumps, if any, in pressure maintaining relation with said working fluid passage means, said control valve when moved to a position severally connecting all of said pumps with said bypass duct being further movable to also place said ram relieving passage means in communication with said bypass duct, and an additional control for said pumps comprising means responsive to a power stroke of said ram and operatively connected with said valve so that as said ram completes its said power stroke said valve is moved to a position wherein only one of said pumps is delivering fluid to said confining space.

4. A hydraulic apparatus comprising a housing having a main inlet passage adapted for communication with a source of fluid, a plurality of pumps within said housing and including portions projecting from said housing for actuation by means externally thereof, said housing including inlet passages severally connecting said pumps with said main passage, a cylindrical valve chamber, a first group of passages severally connecting the discharge sides of said pumps with said valve chamber, a bypass duct in said housing arranged to return fluid to said source, a second group of passages placing said valve chamber in communication with said bypass duct and conforming in number and generally related to said pumps, and a fluid confining space communicating with said valve chamber through a third group of passages including one-way valves controlling the admission of fluid to said space, said third group of passages conforming in number and being generally related to said pumps, a hydraulic ram connected with said fluid confining space, means for relieving fluid pressure on said ram comprising passage means including a portion of said valve chamber, and an annular grooved cylindrical valve in said valve chamber selectively positionable to selectively severally connect one or more of said pumps with said bypass duct through said second group of passages and the remaining pumps, if any, in pressure maintaining relation with said pressure fluid confining space through said third group of passages, said valve when moved to a position severally connecting all of said pumps with said bypass duct being further movable to also place said ram relieving passage means in communication with said bypass duct.

5. A hydraulic control device comprising a housing having a main inlet passage adapted for communication with a source of liquid, a plurality of pumps within said housing and including portions projecting from said housing for actuation by means externally thereof, said housing including inlet passages severally connecting said pumps with said main passage, a cylindrical valve chamber, a first group of passages severally connecting the discharge sides of said pumps with said valve chamber, a return passage means communicating with said source, a second group of passages placing said valve chamber in communication with said return passage means and conforming in number and generally related to said pumps, a pressure fluid confining space having a valve controlled outlet, said space being in communication with said valve chamber through a third group of passages conforming in number to said pumps and each including a pressure maintaining valve therein, and including a valve controlled relief passage connecting said fluid confining space with said return passage means, and comprising an annular grooved cylindrical valve in said valve chamber selectively positionable to connect one or more of said pumps with said fluid confining space through related ones of said third group of passages and the remaining pumps, if any, with said return passage means through related ones of said second group of passages.

6. A hydraulic pump and control unit comprising a housing having a plurality of cylinder chambers opening into said housing through a side wall thereof with the axes of said chambers disposed in a common plane generally normal to said side wall, a pump plunger operatively mounted in each chamber and having a portion extending outward from said side wall for actuation by an external means, said housing including an intake passage means extending inward from said side wall and severally connected with said pump chambers, a cylindrical valve chamber spaced from and extending at a right angle to the axes of said pump chambers, discharge passages severally connecting said pump chambers with said valve chamber, a return passage means opening through said side wall of the housing and connected with said valve chamber, a pressure fluid confining space having a valve controlled outlet, said space being in communication with said valve chamber through a third group of passages conforming in number to said pump chambers and each including a pressure maintaining valve therein, and including a valve controlled relief passage connected with said fluid confining space and opening through said side wall of the housing, and comprising an annular grooved cylindrical valve in said valve chamber selectively positionable to connect one or more of said pumps with said fluid confining space through said third group of passages and the remaining pumps, if any, with said return passage means.

7. A hydraulic pump and control unit comprising a housing having a plurality of cylinder chambers opening into said housing through a side wall thereof with the axes of said chambers disposed in a common plane generally normal to said side wall, a pump plunger operatively mounted in each chamber and having a portion extending outward from said side wall for actuation by an external means, a plurality of cam followers supported on means projecting from said side of the housing and affording swinging movement of said followers about a horizontal axis disposed at a right angle and generally parallel to the longitudinal axes of said plungers, there being a follower operatively associated with each plunger, said housing including an intake passage means extending inward from said side wall thereof and severally connected with said pump chambers, a cylindrical valve chamber spaced from and extending at a right angle to the axes of said pump chambers, discharge passages severally connecting said pump chambers with said valve chamber, a return passage means opening through said side wall of the housing and connected with said valve chamber, a pressure fluid confining space having a valve controlled outlet, said space being in communication with said valve chamber through a third group of passages conforming in number to said pump chambers and each including a pressure maintaining valve therein, and including a valve controlled relief connected passage with said fluid confining space and opening through said side wall of the housing, and comprising an annular grooved cylindrical valve in said valve chamber selectively positionable to connect one or more of said pumps with said fluid confining space through said third group of passages and the remaining pumps, if any, with said return passage means.

8. A hydraulic pump and control unit comprising a housing having a plurality of cylinder chambers opening into said housing through a side wall thereof with the axes of said chambers disposed in a common plane generally normal to said side wall, a pump plunger operatively mounted in each chamber and having a portion extending outward from said side wall for actuation by an external means, a plurality of cam followers supported on means projecting from said side of the housing and affording swinging movement of said followers about a horizontal axis disposed at a right angle and generally parallel to the longitudinal axes of said plungers, there being a follower operatively associated with each plunger, said housing including an intake passage means extending inward from said side wall thereof and severally connected with said pump chambers, a first cylindrical chamber spaced from and extending at a right angle to the axes of said pump chambers, discharge passages severally connecting said pump chambers with longitudinally spaced portions of said first chamber, a fluid return passage means opening through said side wall of the housing and connected with longitudinally spaced portions of said first chamber, a manifold space having a valve controlled outlet and communicating with longitudinally spaced portions of said first chamber through working fluid passages including pressure maintaining valves therein, said working fluid passages conforming in number to said discharge passages, and including a second chamber disposed adjacent and in generally parallel relation to said first chamber, a cylindrical valve disposed in said first chamber and biased by a front means continuously urging said valve toward a position wherein all of said plungers are severally connected with said return passage means, a part disposed in said second chamber and biased by a second means stronger than said first means and continuously acting in a direction opposite thereto, a lever carried by said housing and having one end portion thereof pivotally connected with said part for movement therewith and with a follower part freely engaging the adjacent end of said valve, and an adjustable fulcrum for said lever, said valve being selectively positionable through adjustment of said fulcrum to place all of said pumps in communication with said working fluid passages or to place one or more of said pumps in communication with said return passage means, as desired.

9. A hydraulic pump and control unit adapted to be detachably secured to the wall portion of a hollow lubricant confining and shaft mounting structure having an opening therethrough exposing cam portions on the shaft, comprising a housing having a side thereof presenting marginal surface portions complementary to the wall surfaces bounding the opening to be covered by said housing, a pump plunger operatively mounted within a cylinder chamber extending into said housing from said side thereof, said plunger having a portion extending outward from said side of the housing for actuation by a means externally thereof, a cam follower supported on means projecting from said side of the housing and affording swinging movement of said follower about a horizontal axis disposed at a right angle and generally parallel to the longitudinal axis of said plunger, said housing including an intake passage for said plunger cylinder terminating in a lubricant receiving conduit portion extending outward and downward from said side of the housing, and including a return fluid passage means controllably connected with said cylinder chamber and opening through said side of said housing.

10. A hydraulic pump and control unit adapted to be detachably secured to the wall portion of a hollow lubricant confining and shaft mounting structure having an opening therethrough exposing cam portions on the shaft, comprising a housing having a side thereof presenting marginal surface portions complementary to the wall surfaces bounding the opening to be covered by said housing, a plurality of pump plungers operatively mounted within cylinder chambers extending into said housing from said side thereof, said plungers having portions extending outward from said side of the housing for actuation by a means externally thereof, a plurality of cam followers supported on means projecting from said side of the housing and affording swinging movement of said followers about a horizontal axis disposed at a right angle and generally parallel to the longitudinal axes of said plungers; there being a follower operatively associated with each pump plunger, said housing including an intake passage for said plunger cylinders terminating in a lubricant receiving conduit portion extending outward and downward from said side of the housing, and including a plurality of return fluid passage means controllably connected with said cylinder chambers and opening through said side of said housing.

11. A hydraulic pump and control unit adapted to be detachably secured to the wall portion of a hollow lubricant confining and shaft mounting structure having an opening therethrough above the level of the confined lubricant and exposing cam portions on the shaft, comprising a housing having a side thereof presenting marginal surface portions complementary to the wall surfaces bounding the opening to be covered by said housing, a plurality of pump plungers operatively mounted within cylinder chambers extending into said housing from said side thereof, a plurality of cam followers supported on means projecting from said side of the housing above said cylinder chambers and affording swinging movement of said followers about a horizontal axis disposed at a right angle and generally parallel to a plane through the longitudinal axes of said plungers, there being a follower operatively associated with each pump plunger, said housing including an intake passage for said plunger cylinders terminating in a lubricant receiving conduit portion extending outward and downward from said side of the housing at a point below said cylinder chambers, and including a plurality of return fluid passage means controllably connected with said cylinder chambers and opening through said side of said housing.

12. In combination with a hollow lubricant confining structure operatively enclosing a rotating shaft presenting cam portions and having a wall portion provided with an opening therethrough which is above the level of the confined lubricant and which exposes the cam portions of said shaft, a hydraulic pump and control unit comprising a housing detachably secured to said casing with a side of said housing covering said opening; a plurality of pump plungers operatively mounted within cylinder chambers extending into said housing from said side thereof in generally opposed relation to the cam portions on said shaft, a plurality of cam followers supported on means projecting from said side of the housing above said cylinder chambers and affording swinging movement of said followers about a horizontal axis generally parallel to said shaft, said cam followers depending from said supporting means with a lower portion of each follower establishing an operative connection between a pump plunger and an opposed cam portion on said shaft, said housing including an intake passage means for said plunger cylinders terminating in a lubricant receiving conduit portion extending outward from said side of the housing at a point below said cylinder chamber and into the lubricant confined in said casing, and including a plurality of return fluid passage means communicating with the interior of said casing through said side of the housing enclosing said opening.

13. In combination with a self-propelled vehicle including an engine, a transmission spaced from said engine, a main power shaft disposed between and selectably connectable with said engine and transmission through clutch means operatively associated with opposite end portions of said shaft, said shaft having cam portions thereon intermediate the ends thereof, and including a hollow lubricant confining casing operatively enclosing said shaft and having a wall portion provided with an opening therethrough which is above the level of the confined lubricant and which exposes the cam portions of said shaft, a hydraulic pump and control unit comprising a housing detachably secured to said casing with a side of said housing covering said opening; a plurality of pump plungers operatively mounted within cylinder chambers extending into said housing from said side thereof in generally opposed relation to the cam portions on said shaft, a plurality of cam followers supported on means projecting from said side of the housing above said cylinder chambers and affording swinging movement of said followers about a horizontal axis generally parallel to said shaft, said cam followers depending from said supporting means with a lower portion of each follower establishing an operative connection between a pump plunger and an opposed cam portion on said shaft, said housing including an intake passage means for said cylinder chambers terminating in a lubricant receiving conduit portion extending outward from said side of the housing at a point below said cylinder chambers and into the lubricant confined in said casing, and including a plurality of return fluid passage means communicating with the interior of said casing through said side of the housing enclosing said opening.

14. A hydraulic apparatus comprising a source of fluid and parts constructed and combined to operatively house a plurality of pumps, said parts defining an intake passage means placing said pumps in continuous communication with said source, a first cylindrical chamber severally communicating with the discharge sides of said pumps, return passage means placing said first chamber in communication with said source of fluid, a manifold communicating with said first chamber through passages including pressure maintaining valves therein, said passages conforming in number and being generally related to said pumps, a check valve controlled outlet means for said manifold, and a second cylindrical chamber generally parallel to said valve chamber, a cylindrical valve disposed in said first chamber and biased by a first means continuously urging said valve toward a position wherein all of said pumps are severally connected with said return passage means, a part disposed in said second chamber and biased by a second means stronger than said first means and continuously acting in a direction opposite thereto, a lever having a manually adjustable fulcrum and having one end thereof pivotally connected with an end of said part for movement therewith and with a follower part engaging the adjacent end of said valve, said valve being selectively positionable through adjustment of said fulcrum to place all of said pumps in communication with the related passages leading to said manifold or to place some of said pumps in communication with said return passage means, a hydraulic ram operatively connected with said outlet means, and an additional control for said pumps comprising means responsive to a power stroke of said ram and operatively connected with said lever so that as said ram completes its said power stroke said part moves to a position such that said first biasing means moves said control valve to a position wherein only one of said plungers is delivering fluid to said manifold.

15. A hydraulic apparatus comprising a source of fluid and parts constructed and combined to operatively house a plurality of pumps, said parts defining an intake passage means placing said pumps in continuous communication with said source, a first cylindrical chamber severally communicating with the discharge sides of said pumps, return passage means placing said first chamber in communication with said source of fluid, a manifold comunicating with said first chamber through passages including pressure maintaining valves therein, said passages conforming in number and being generally related to said pumps, a valve controlled outlet means for operatively connecting a hydraulic motor with said manifold, and defining a second cylindrical chamber generally parallel to said valve chamber, a cylindrical valve disposed in said first chamber and biased by a first means continuously urging said valve toward a position wherein all of said pumps are severally connected with said return passage means, a part disposed in said second chamber and biased by a second means stronger than said first means and continuously acting in a direction opposite thereto, and a lever having a manually adjustable fulcrum and having one end thereof pivotally connected with an end of said part for movement therewith and with a follower part engaging the adjacent end of said valve, said valve being selectively positionable through adjustment of said fulcrum to place all of said pumps in communication with the related passages leading to said manifold or to place one or more of said pumps in communication with said return passage means.

16. In combination with a self propelled vehicle having an engine, a transmission spaced from said engine, a main power shaft disposed between and selectably connectable with said engine and transmission through clutch means operatively associated with opposite end portions of said shaft, said shaft having cam portions thereon intermediate the ends thereof, and having a hollow lubricant confining casing operatively enclosing said shaft and having a wall portion provided with an opening therethrough exposing the cam portions on said shaft, a hydraulic pump comprising a housing detachably secured to said casing in covering relation to said opening, a plurality of pump plungers operatively mounted in said housing and extending into said casing for operative engagement with the cam portions on said shaft, intake passage means for said pump affording communication between said plungers and the lubricant confined in said casing, and return passage means in said housing communicating with the interior of said casing through the side of the housing covering the opening in said casing.

17. In a hydraulic apparatus including a pump means, a source of fluid communicating with said pump means, a valve housing having a valve chamber therein receiving fluid from said pump means, a fluid return passage means placing said valve chamber in communication with said source, a pressure fluid discharge passage placing said valve chamber in communication with a hydraulic motor, said discharge passage having a check valve therein to prevent a return flow of fluid from said motor, an outlet passage for said hydraulic motor placing same in communication with said valve chamber, and a control valve in said chamber selectively positionable to connect said fluid return passage means and said discharge passage jointly and severally with said valve chamber and to control said outlet passage, said control valve when moved to a position directing all of the pressure fluid discharged by said pump means to said fluid return passage being further movable to also place said hydraulic motor outlet passage in communication with said return passage means through said valve chamber.

18. In a hydraulic apparatus including a pump means, a source of fluid communicating with said pump means, a valve housing having a valve chamber therein receiving fluid from said pump means, a fluid return passage means placing said valve chamber in communication with said source, a pressure fluid discharge passage communicating with said valve chamber, a control valve in said chamber selectively positionable to connect said fluid return passage means and discharge passage jointly and severally with said valve chamber, a check valve controlled pressure relief passage placing said discharge passage in communication with said return passage means, and an additional check valve disposed in said discharge passage in remote relation to said valve chamber for controlling the flow of fluid from said discharge passage and coacting with said control valve to provide a pressure fluid accumulating space therebetween.

19. In a hydraulic apparatus including a pump means, a source of fluid communicating with said pump means, a valve housing having a valve chamber therein receiving fluid from said pump means, a fluid return passage means placing said valve chamber in communication with said source, a pressure fluid discharge passage communicating with said valve chamber, a control valve in said chamber selectively positionable to connect said fluid return passage means and discharge passage jointly and severally with said valve chamber, a pressure relief passage placing said discharge passage in communication with said return passage means, a first check valve disposed to control the flow of fluid from said valve chamber into said discharge passage, a second check valve disposed to control the flow of pressure fluid through said pressure relief passage, and a third check valve disposed in downstream remote relation to said first check valve to provide a pressure fluid accumulating space therebetween.

20. In a hydraulic apparatus including a pump means, a source of fluid communicating with said pump means, a valve housing having a valve chamber therein receiving fluid from said pump means, a fluid return passage means placing said valve chamber in communication with said source, a pressure fluid discharge passage communicating with said valve chamber, a control valve in said chamber selectively positionable to connect said fluid return passage means and discharge passage jointly and severally with said valve chamber, a first check valve disposed to control the flow of fluid from said valve chamber into said discharge passage, and a second check valve disposed in said discharge passage in downstream remote relation to said first check valve to provide a pressure fluid accumulating space therebetween.

21. In a hydraulic apparatus including a plurality of pumps, a source of fluid communicating with said pumps, a valve housing having a valve chamber therein severally communicating with said pumps and receiving discharge fluid therefrom, a return passage means comprising a first group of passages placing said valve chamber in communication with said source and conforming in number and generally related to said pumps, a pressure fluid discharge passage means placing said valve chamber in communication with a hydraulic motor, said discharge passage means comprising a second group of passages conforming in number and generally related to said pumps placing said valve chamber in communication with a manifold space having a check valve controlled outlet to said hydraulic motor, an outlet passage for said hydraulic motor placing same in communication with said valve chamber, and a control valve in said chamber selectively positionable to connect one or more of said pumps with said manifold through related ones of said second group of passages and the remaining pumps, if any, with said return passage means through related ones of said first group of passages, said control valve when moved to a position wherein all of said pumps are in communication with return passage means being further movable to also place said hydraulic motor outlet passage in communication with said return passage means.

22. The hydraulic apparatus set forth in claim 21, including a control part adjustable to selectively limit the movement of said control valve and thereby vary the number of pumps that can be connected in fluid delivering relation to said manifold space through movement of said valve.

23. The hydraulic apparatus set forth in claim 21, including an unloading control for said pumps comprising means responsive to a power stroke of said hydraulic motor and operatively connected with said control valve so that as said hydraulic motor completes its power stroke said valve is moved to a position wherein less fluid is delivered to said manifold.

WALTER F. STREHLOW.

REFERENCES CITED

The following references are of record in the file of this patent:

UNITED STATES PATENTS

| Number | Name | Date |
| --- | --- | --- |
| 753,361 | Chase | Mar. 1, 1904 |
| 1,123,712 | Driver | Jan. 5, 1915 |
| 1,455,528 | Hansen | May 15, 1923 |
| 1,497,258 | Beals | June 10, 1924 |
| 1,692,771 | Ferris | Nov. 20, 1928 |
| 1,982,711 | Vickers | Dec. 4, 1934 |
| 2,159,360 | Starr et al. | May 23, 1939 |
| 2,185,144 | Edwards | Dec. 26, 1939 |
| 2,192,778 | Stacy | Mar. 5, 1940 |
| 2,276,895 | Vosseler et al. | Mar. 17, 1942 |
| 2,451,013 | Ziskal et al. | Oct. 12, 1948 |